L. NILSON.
TRACTION MACHINE.
APPLICATION FILED FEB. 9, 1915.

1,206,895.

Patented Dec. 5, 1916.

WITNESSES
M. R. McInnis
J. E. Sorensen

INVENTOR
LEONARD NILSON
BY Paul & Paul
ATTORNEYS

UNITED STATES PATENT OFFICE.

LEONARD NILSON, OF WAYZATA, MINNESOTA.

TRACTION-MACHINE.

1,206,895.          Specification of Letters Patent.          Patented Dec. 5, 1916.

Application filed February 9, 1915. Serial No. 7,033.

*To all whom it may concern:*

Be it known that I, LEONARD NILSON, citizen of the United States, resident of Wayzata, county of Hennepin, State of Minnesota, have invented certain new and useful Improvements in Traction-Machines, of which the following is a specification.

The object of my invention is to provide means by which, whenever desired, the traction surface of a traction wheel can be increased to adapt the machine for pulling a greater load and for use in a soil where it is desirable to temporarily, at least, increase the wheel tread.

The invention consists generally in various constructions and combinations, all as hereinafter described and particularly pointed out in the claims.

Figure 1:
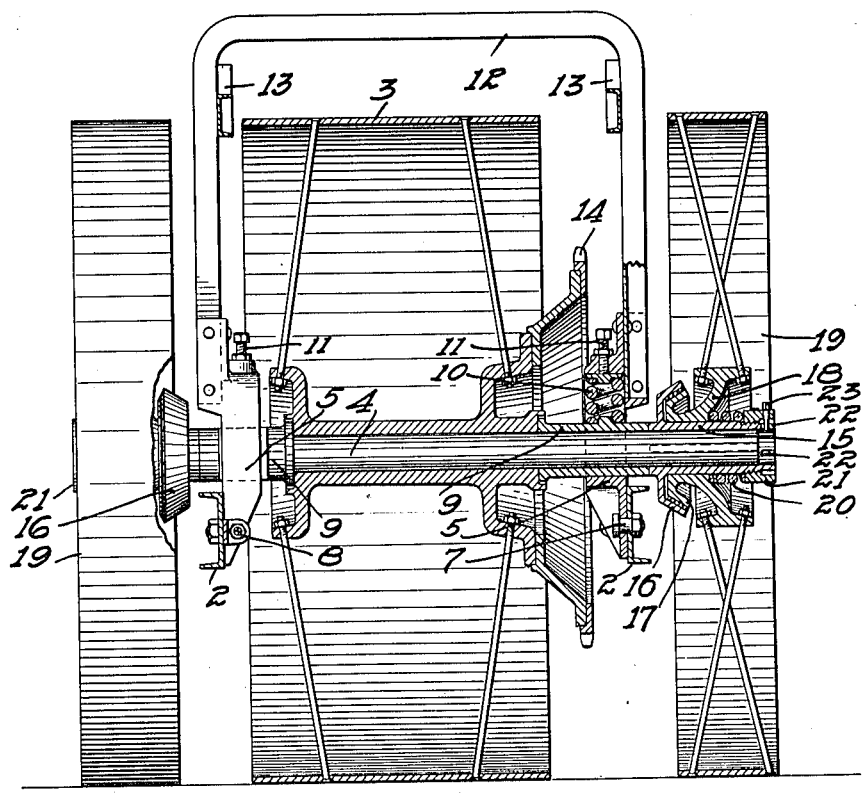
Figure 2:
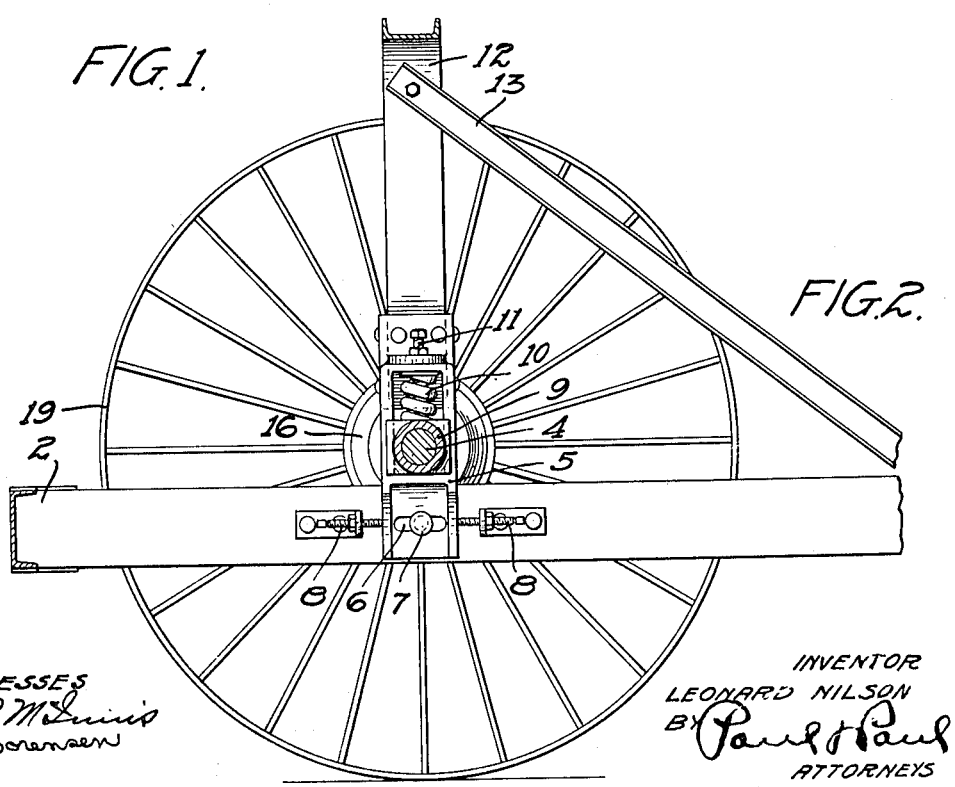

In the accompanying drawings forming part of this specification, Figure 1 is a vertical sectional view through a traction machine embodying my invention, Fig. 2 is a vertical sectional view through the axle and yoke between the traction wheel and one of the supplementary wheels.

In the drawing, 2 represents the frame of the machine and 3 a traction wheel and 4 an axle therefor.

5 represents boxes through which the axle extends, having their lower ends adjustable in the side rails of the frame 2 by means of slots 6 and bolts 7. Screws 8 are mounted in the frame for adjusting the boxes back and forth thereon. The bearings 9 for the axle are seated in the boxes and yieldingly held by springs 10 having means, such as bolts 11, for increasing or decreasing the pressure of the springs on the bearings. A yoke 12 is mounted to straddle the wheel 3 and is secured to the boxes, and braces 13 connect the upper portion of this yoke with the machine frame in advance of the traction wheel. A driven wheel 14 is mounted on one side of the traction wheel to be driven from the source of power, not shown. The axle 4 extends outwardly beyond the frame of the machine on each side and a sleeve 15 is keyed on each end of the axle outside the machine frame and is provided with a flange 16 forming one member of a friction clutch, the other member 17 being formed on the inner end of a hub 18 of an auxiliary or supplementary traction wheel 19. A spring 20 is interposed between the hub 18 and a collar 21 by means of which the spring can be put under compression to seat the clutch member on the hub against the other clutch member on the sleeve of the axle, thereby temporarily locking them together for simultaneous movement with the main traction wheel. This clutch connection, while sufficient to prevent premature turning of the auxiliary wheels, will, nevertheless, allow sufficient slippage to compensate for the difference in movement of the wheel in making a turn.

The collar 21 is interiorly threaded, as shown, and engages the exteriorly threaded end of the sleeve 15. The outer end of the sleeve is provided with slots 22 to receive a pin 23 that is inserted therein when the threaded collar is revolved to compress the spring and force the wheel hub against the flange to temporarily lock them together. It will be understood that when the collar 21 is loosened, the wheel 19 will become idle on its supporting sleeve.

In various ways the details of construction herein shown and described may be modified and still be within the scope of my invention.

I claim as my invention:

1. The combination, with a frame, of a traction wheel mounted therein and an axle therefor, supplementary wheels disposed upon opposite sides of said traction wheel and concentric therewith and having means for clamping them to revolve with said traction wheel, said means allowing said wheels to slip to compensate for the difference in travel in turning.

2. The combination, with a frame and a traction wheel mounted therein and having an axle projecting outwardly on each side of said wheel, sleeves secured on the projecting ends of said axle and having friction surfaces, supplementary wheels having hubs loosely mounted on said sleeves and means for clamping said hubs against said friction surfaces.

3. The combination, with a frame, of a traction wheel and a supplementary wheel disposed upon each side of said traction wheel and having frictional driving means for rendering said supplementary wheels active or inactive 4. The combination, with a frame and a traction wheel, of an axle projecting outwardly beyond said wheel, a sleeve secured to the projecting portion of said axle and having a friction surface, a supplementary wheel having a hub for engaging said friction surface, and means for clamping said hub against said friction surface with a yielding pressure.

5. The combination, with a frame, of a traction wheel mounted therein and a supplementary wheel disposed at one side of said traction wheel and having frictional driving means for rendering said supplementary wheel active or inactive.

6. The combination, with a frame, of a traction wheel mounted therein provided with an outwardly projecting axle, of a sleeve secured on said axle and having a friction surface, a supplementary wheel having a hub to engage said friction surface, a collar having threaded engagement with said sleeve, and a spring interposed between said collar and said hub for forcing it against said friction surface and clamping said hub and sleeve together with a yielding pressure.

7. The combination, with a frame, of a traction wheel mounted therein and an axle having end portions extending outwardly on each side of said frame, of supplementary wheels mounted on the projecting portions of said axle and having means for clamping them thereon with a yielding pressure, said means allowing said wheels to slip to compensate for the difference in travel in turning.

8. The combination, with a frame, of a traction wheel mounted therein, supplementary traction wheels disposed upon opposite sides of said first named wheel and concentric therewith, and having driving connections with said first named wheel, said supplementary wheels being mounted for relative revolution.

In witness whereof, I have hereunto set my hand this 2nd day of February, 1915.

LEONARD NILSON.

Witnesses:
EDWARD A. PAUL,
G. E. SORENSEN.